(12) United States Patent
Beishline

(10) Patent No.: US 6,806,664 B2
(45) Date of Patent: Oct. 19, 2004

(54) ELECTRO-MECHANICAL ACTUATOR INCLUDING BRUSHLESS DC MOTOR FOR PROVIDING PINCH PROTECTION

(75) Inventor: Eric Beishline, Marlborough, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 10/099,919

(22) Filed: Mar. 15, 2002

(65) Prior Publication Data

US 2003/0038606 A1 Feb. 27, 2003

Related U.S. Application Data

(60) Provisional application No. 60/276,032, filed on Mar. 15, 2001.

(51) Int. Cl.$^7$ ................................................ H02P 1/00

(52) U.S. Cl. ..................... 318/280; 318/461; 318/466; 318/445; 318/469; 318/286; 49/26; 49/28

(58) Field of Search .............................. 318/280, 282, 318/286, 366, 369, 445, 461, 466, 468, 469; 49/26, 28

(56) References Cited

U.S. PATENT DOCUMENTS

| | | | |
|---|---|---|---|
| 4,970,446 A | * 11/1990 | Yaguchi | 318/280 |
| RE34,287 E | 6/1993 | Berner et al. | 49/322 |
| 5,334,876 A | 8/1994 | Washeleski et al. | 307/10 |
| 5,351,439 A | * 10/1994 | Takeda et al. | 49/28 |
| 5,422,551 A | * 6/1995 | Takeda et al. | 318/265 |
| 5,539,290 A | * 7/1996 | Lu et al. | 318/565 |
| 5,610,484 A | * 3/1997 | Georgin | 318/286 |
| 5,627,710 A | * 5/1997 | Scheffler | 361/23 |
| 5,734,245 A | * 3/1998 | Tarashima et al. | 318/453 |
| 5,832,664 A | * 11/1998 | Tajima et al. | 49/26 |
| 5,982,124 A | 11/1999 | Wang | 318/466 |
| 6,051,945 A | * 4/2000 | Furukawa | 318/280 |

* cited by examiner

Primary Examiner—Rina Duda
(74) Attorney, Agent, or Firm—Grossman, Tucker, Perreault & Pfleger, PLLC

(57) ABSTRACT

An electro-mechanical actuator including a brushless DC motor for driving an output of the actuator; and a motor controller. The controller is configured to interrupt operation of the motor in response to at least one feedback signal representative of a motor parameter that varies with variation in a load on the output. The actuator output may be coupled to a window lift mechanism for moving a vehicle window between open and closed positions.

18 Claims, 3 Drawing Sheets

ELECTRO-MECHANICAL ACTUATOR INCLUDING BRUSHLESS DC MOTOR FOR PROVIDING PINCH PROTECTION

CROSS-REFERENCE TO RELATED APPLICATIONS

The present application claims the benefit of the filing date of U.S. Provisional Application Ser. No. 60/276,032, filed Mar. 15, 2001, the teachings of which are incorporated herein by reference.

FIELD OF THE INVENTION

The present invention relates generally to electro-mechanical actuators, more particularly, to an electro-mechanical actuator including a brushless DC motor for providing pinch protection.

BACKGROUND OF THE INVENTION

Pinch protection is a desirable feature in a variety of electro-mechanical actuator configurations for moving a movable element between open and closed positions. In such configurations, the movable element presents a hazard associated with the possibility of compressing or pinching an obstruction between the element and a housing or frame as the element moves to a closed position. Absent pinch protection, a person may be injured, for example, if a part of his body is inadvertently "pinched" between the element and a corresponding housing the element is closing against. In addition, system damage may occur to the motor or internal actuator mechanisms if the closing element is closed on some other robust obstruction.

In a specific example, it is desirable to provide pinch protection in a window lift actuator system that drives a car window between its open and closed position. When the car window is closing, a safety hazard may result if a person's hand or finger is positioned between the window and the door frame. Some other robust obstruction may also be caught in the closing window, causing damage to the window and/or the window lift actuator system.

A pinch protection arrangement disables the actuator in the presence of an obstruction so that the system will not cause injuries or become damaged. Some pinch protection designs have simply incorporated a low force actuator that stalls under load. Importantly, however, the actuator should be capable of closing the window with sufficient force to enable closure in adverse environmental conditions and to properly seal the window.

Unfortunately, merely limiting the amount of force applied to the element by the actuator is generally not a viable solution to the safety hazard associated with closure of the element. Despite the need to provide safe conditions during closing, it is generally necessary to close the element with sufficient force against system components, e.g. seals and gaskets, that provide resistance or that need to be compressed by the actuator during some portion of the operation. Also, environmental conditions such as temperature extremes, dust, dirt and ice in the case of a window lift actuating system and other actuator systems should not cause the system to become inoperable due to the actuator not generating sufficient closure force. For these and other related reasons, it is generally not viable to provide for safe operation merely by using a low force actuator.

Accordingly, there is a need in the art for an actuator that provides efficient and reliable pinch protection for interrupting normal operation under certain conditions. There is a further need in the art for an actuator that safely and reliably closes a car window in a window lift actuator system.

SUMMARY OF THE INVENTION

An electro-mechanical actuator consistent with the invention includes: a brushless DC motor for driving an output of the actuator; and a motor controller. The controller is configured to interrupt operation of the motor in response to at least one feedback signal representative of a motor parameter that varies with variation in a load on the output. The feedback signal may be representative of motor current and/or motor speed. A feedback signal representative of motor speed may be the motor rotational position. A rotational position feedback signal may also be used for identifying zones of output movement wherein pinch protection is enabled/disabled. In one embodiment, the actuator output may be coupled to a window lift mechanism for moving a vehicle window between open and closed positions. Motor operation may be interrupted in response to a feedback signal representative of a motor parameter that varies with variation in a load on the window.

A method of providing pinch protection in vehicle window lift system for moving a vehicle window between open and closed positions consistent with the invention includes; providing a brushless DC motor for driving an output of an actuator, the output being coupled to a window lift mechanism for moving the window between the open and closed positions; sensing at least one parameter of the motor that varies with a variation in a load on the window; and disabling the motor when the parameter reaches a predetermined level. In one embodiment, the method may further include: identifying at least one zone of travel for the window wherein pinch protection is enabled; determining if the window is in the zone; and disabling the motor in the disabling step if the window is in the zone.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1:
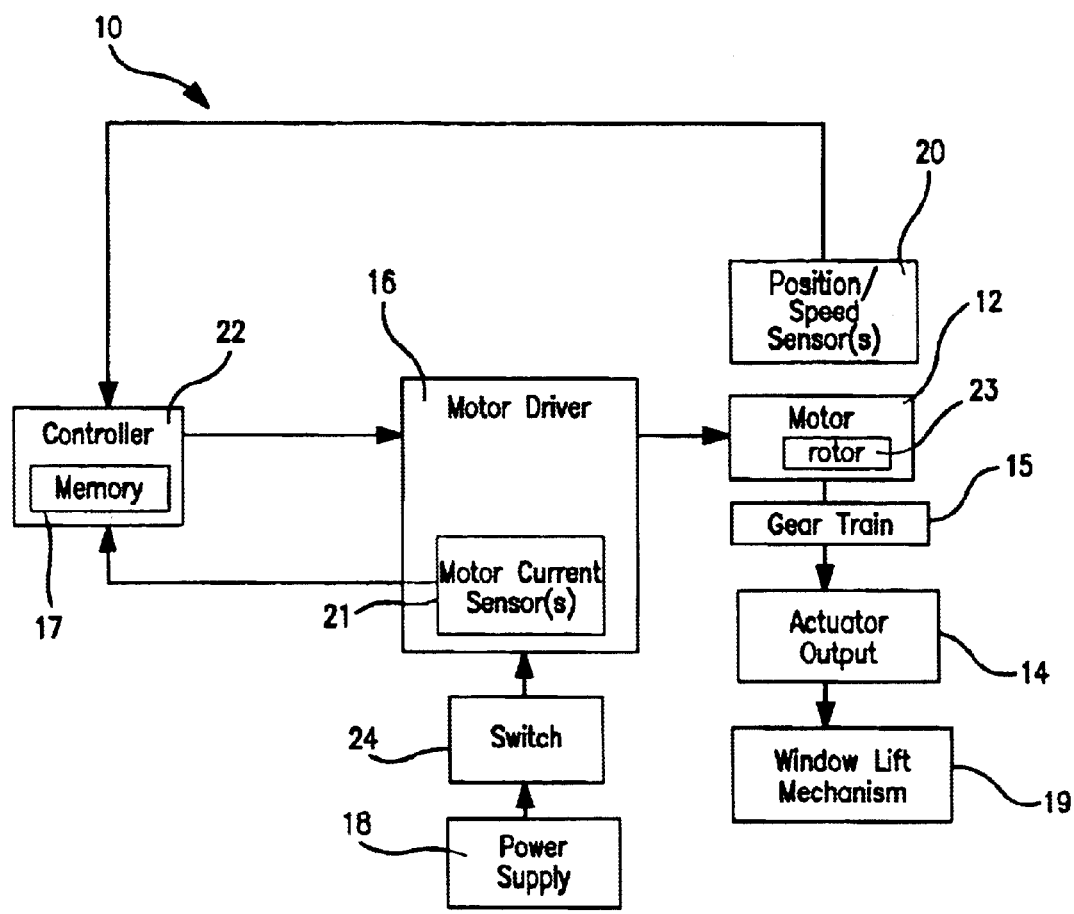
FIG. 1 is a block diagram of an exemplary system consistent with the present invention.

Referring to FIG. 1, there is illustrated an exemplary brushless DC motor 12 in a closed loop control system 10 consistent with the invention. Those skilled in the art will recognize that the exemplary system 10 is illustrated in simplified block-diagram form with the motor 12 configured for driving an actuator output 14 through a gear train 15. The actuator output 14 is coupled to and drives a movable element, such as a window lift mechanism 19.

It will be recognized that the motor may be coupled to the actuator output 14 through a variety of gear train configurations for driving a movable element linearly or rotationally and/or at a desired speed/torque. Although the movable element in the illustrated embodiment is a window lift mechanism 19, the movable element may take a variety of configurations including, for example, a rotational fuel filler valve, sunroof mechanism, etc. Those skilled in the art will also recognize other systems where a brushless DC configuration consistent with the present invention may be utilized. It is to be understood, therefore, that the embodiments described herein are described by way of illustration, not of limitation.

In the illustrated system of FIG. 1, the actuator output 14 may drive the movable window lift mechanism 19 to move a vehicle window between open and closed positions. Operation of the motor 12, and thus the actuator output, to achieve an open or closed position may be controlled via a switch 24, e.g. in the vehicle passenger compartment, which controls connection of a power supply 18, e.g. the vehicle battery, to a motor driver circuit 16. The power supply 18 provides a supply voltage Vs for the motor driver circuit 16, which may take a variety of configurations known to those skilled in the art.

The motor driver circuit provides current to the motor windings in response to commutation control signals from a controller 22. The controller 22 preferably includes appropriate circuitry/logic to generate the control signals 11 in response to one or more feedback signals representing current motor operating conditions/parameters. Two such parameters that may be sensed directly or computed from other variables are the speed of the motor ($\omega$), i.e. the rotational speed of the rotor 23 of the motor, and the motor current draw (I).

Figure 2:
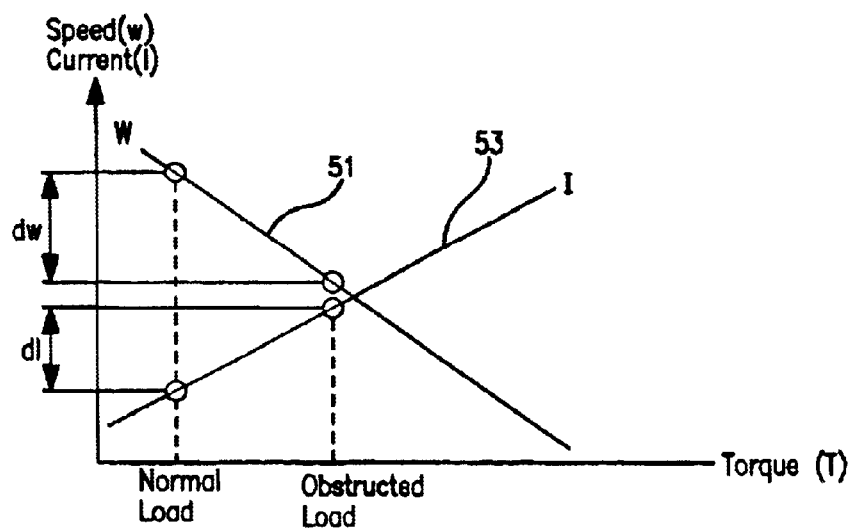
FIG. 2 is a plot of motor speed and current vs. torque for a brushless DC motor in a system consistent with the invention illustrating variation between normal and obstructed load conditions.

Motor speed and motor current draw are both effected by a load on a movable element, which would indicate a blockage or obstruction requiring pinch protection. FIG. 2, for example, is a plot of motor speed ($\omega$) 51 and motor current draw 53 over torque (T) showing variation (d$\omega$, dI) between normal load and obstructed load conditions. As shown, when a blockage or obstruction occurs causing an obstructed load, the motor speed decreases and motor current draw increases. Advantageously, if the obstruction is robust enough, i.e. d$\omega$/dT and/or dI/dT in FIG. 2, exceeds some predetermined value required to trigger a pinch protection condition, the controller 22 may provide control signals that disable the output of the motor drive circuit 16 and hence shut down the motor 12. The controller may also be configured to cause retraction of the movable element in a pinch protection condition, whereby the obstruction may be removed.

In a vehicle window lift application wherein the movable element is a window lift mechanism 19, for example, if the window encounters an obstruction or blockage, e.g. an person's hand, as it is closing against the window frame, the motor speed ($\omega$) will decrease and the motor current (I) will increase. From feedback signals representative of the motor speed and/or the motor current, the controller may distinguish between a modest blockage where the pinch protection feature should not be activated, and a more severe blockage that should enable the pinch protection feature by interrupting power to the motor 12 and/or retracting the window by operating the motor in a reverse direction. The controller 22 thus may include state machine type logic and/or a processor for generating control signals in response to the feedback signals and programmed instructions stored on a machine-readable memory, e.g. memory 17. A variety of brushless DC motor controller configurations will be known to those skilled in the art.

In the illustrated embodiment, one or more feedback signals are provided by associated position/speed sensor(s) 20 and/or motor current sensor(s) 21. A feedback signal representative of motor current may be obtained in a variety of ways known to those skilled in the art. For example, one or more of the motor current sensor(s) 21 may be current sense resistor(s) in the motor driver 16 for providing current to the controller 22 representative of the stator current.

A controller 22 consistent with the invention may be configured/programmed to provide pinch protection in response to the rate of change of the motor current sensed by sensor(s) 21. For example, if the motor current varies rapidly with time, then an actual blockage or obstruction may be present. In this instance the controller may disconnect the power supply to provide pinch protection. On the other hand, if the motor current varies slowly with time, a door seal degradation or dirt buildup may be indicated, and the controller may be configured to continue operation of the motor to disable pinch protection. A controller may thus be programmed or calibrated to enable pinch protection at some threshold rate of change for the motor current particular to the system.

To provide feedback representative of motor rotational speed to the controller, one or more of the position/speed sensors 20 may be configured as rotational position sensors. The controller 22 may determine motor speed from the rate of change of position feedback signals from the sensor(s) 20 as a function of time. A frequency/voltage converter may also be utilized to relate the rate of change of the position feedback signal(s) to a distinct voltage level representative of motor speed. In addition, if the relationship between current draw and the speed of the motor as a function of supply voltage is known, the speed can be determined from one or more of the current sensor 21 outputs.

In some applications, it may be desirable to enable or disable pinch protection based on the position of the movable element. In a window lift application, for example, it may be desirable to enable pinch protection in a "pinch protection zone" of travel until a "non-pinch protection zone" of travel is reached wherein it is relatively certain that no objects could enter a space between the window and the doorframe. At that point, pinch protection may be disabled to allow full torque of the motor to be applied for sealing the window to the associated seal regardless of motor current or rotational speed variation.

Advantageously, use of rotational position sensors facilitates calculation of, not only the motor speed, but also the position of a movable element in a system consistent with the invention. For example, the controller may be configured to count the number of rotations of the rotor from the position sensor outputs. The number of rotations may be used to calculate, e.g. using gear ratios associated with the gear train 15, the corresponding linear or rotational travel of the movable element, e.g. the window lift mechanism 19, from a calibrated "zero" position. The controller may be configured to enable or disable pinch protection based on the calculated position of the moveable element.

Figure 3:
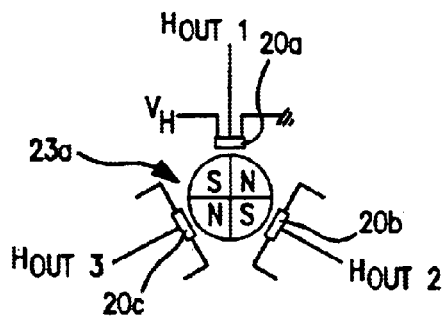
FIG. 3 schematically illustrates a two-pole pair rotor configuration for a brushless DC motor in a system consistent with the invention.

Several sensors for providing an output representative of the motor rotational position will be known to those skilled in the art. For example, Hall effect, optical, magneto-resistive, fluxgate sensors, as well as conventional electrical or electro-optical speed sensors, may be useful in connection with the present invention for sensing motor rotational position. FIG. 3 illustrates an exemplary configuration including three Hall effect sensors 20a, 20b, and 20c for sensing the position of a two-pole pair rotor 23a. Each of the Hall sensors is placed in the magnetic field associated with the rotor poles to provide an output representative of the rotational position of the rotor 23a with respect to the stator. As will be understood by those skilled in the art, the output of each Hall sensor varies with rotation of the rotor. For example, a digital Hall effect sensor may be configured to provide a digital "1" output when in the presence of a predetermined level of magnetic flux and to output a digital "0" when the predetermined level of flux is absent.

In the configuration of FIG. 3, the three Hall effect sensors 20a, 20b, and 20c sense the changing magnetic flux generated from the two magnetic pole pairs of the exemplary rotor 23a. In particular, as a north pole (N) of the rotor comes in proximity to a sensor the magnetic field associated therewith causes the sensor to output a digital "1", and when a south pole (S) is in proximity to a sensor the sensor provides a digital "0" output. Thus in the illustrated configuration, the collective outputs from the Hall devices to the controller 22 change to a new state every one-sixth of a revolution or every 60 degrees of rotor rotation.

Table 1 below illustrates the Hall outputs for each of the six separate positions available in the illustrated exemplary embodiment. The rotor position illustrated in FIG. 3, for example, corresponds to position 4 on Table 1.

TABLE 1

| Position | Hall 20a | Hall 20b | Hall 20c |
|----------|----------|----------|----------|
| 1 | 1 | 0 | — |
| 2 | 0 | 1 | — |
| 3 | — | 1 | 0 |
| 4 | — | 0 | 1 |
| 5 | 0 | — | 1 |
| 6 | 1 | — | 0 |

The Hall outputs thus identify the rotational position of the rotor relative to the stator during a single rotor revolution. As discussed above, the position of a movable element coupled to the motor through an actuator output may be determined from the Hall outputs. In addition, rotational speed of the rotor may be monitored by the controller 22 based on the rate of change between the Hall output states.

Those skilled in the art will recognize that the resolution of a system consistent with the invention may be adjusted by varying the number of Hall sensors and/or the configuration of the rotor poles. For example, the illustrated exemplary arrangement using three Hall effect sensors with a two-pole magnet provides a higher resolution of position (6 counts per revolution) than a system including only two Hall effect sensors for use with a two-pole magnet (4 counts per revolution).

Figure 4:
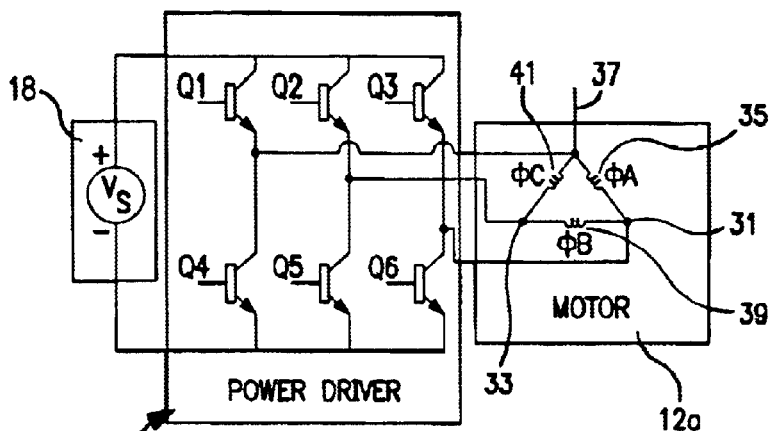
FIG. 4 schematically illustrates an exemplary bipolar motor driver circuit connected in delta to a three-phase brushless DC motor in a system consistent with the invention.

In response to the feedback signals, the controller provides control signals to the motor driver 16 for controlling commutation of the motor windings. FIG. 4 illustrates an exemplary circuit configuration for a motor driver 16a consistent with the invention. The illustrated exemplary circuit includes six, Q1–Q6, NPN transistors connected to a three-phase motor 12a via a delta connection and driven by power supply voltage Vs derived from power supply 18. The emitter of the first NPN transistor Q1 is electrically connected to a common terminal 35 between the third winding 41 (phase C) and the first winding 37 (phase A) of the motor 12, and to the collector of the fourth NPN transistor Q4. Similarly, the emitter of the second NPN transistor Q2 is electrically connected to a common terminal 33 between the second winding 39 (phase B) and the third winding 41 (phase C). Finally, the collector of the sixth NPN transistor Q6 is electrically connected to a common terminal 31 between the first winding 37 (phase A) and the third winding 41.

The positive terminal of the supply voltage Vs is electrically connected to the collectors of the first three NPN transistors Q1–Q3, while the negative terminal of supply voltage Vs is electrically connected to the emitters of the last three NPN transistors Q4–Q6. The transistors Q1–Q6 may drive the motor 12 in response to control signals provided at the base of the transistors from the controller 22. It should be understood by those skilled in the art that various other motor configurations such as a wye connection, where each winding is connected in common to a neutral point, may also be utilized.

Figure 5:
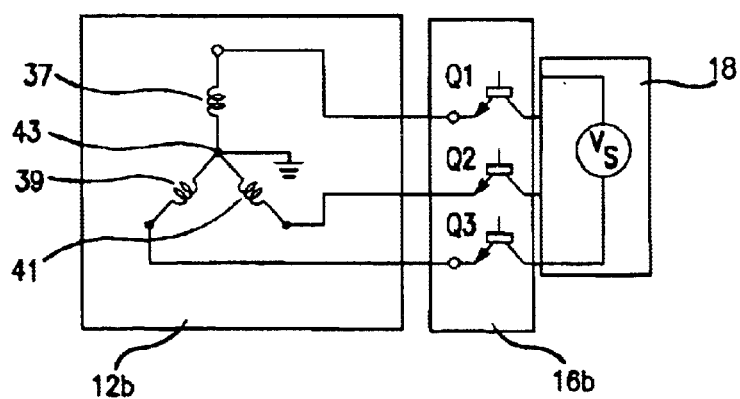
FIG. 5 schematically illustrates an exemplary unipolar motor driver circuit connected in wye to a three-phase brushless DC motor in a system consistent with the invention.

Turning to FIG. 5, another exemplary circuit configuration for a unipolar power driver 16b is illustrated. The collectors of three NPN transistors Q1–Q3 are each electrically connected to Vs, which is derived from power supply 18, and the emitters of the same transistors are each electrically connected to three separate windings 37, 39, & 41 of a motor 12b. The windings 37,39, & 41 are connected in a wye configuration to a common neutral point 43. Other exemplary power driver 16 circuit configurations known to those skilled in the art may also be utilized.

If a brushless DC motor system consistent with the invention uses an open loop approach, as opposed to the closed loop approach illustrated in FIG. 1, position and speed sensing may be achieved by monitoring the transistor-transistor logic (TTL) level output of the control signals from the controller 22 to the motor drive transistors in the drive circuit. For bipolar motor drive, as shown in FIG. 4, for example, position sensing resolution may be six counts per revolution of the rotor 23. Positive and negative edge counting of the control/commutator signals from the controller 22 to the drive circuit may also be utilized. Advantageously, edge counting of the control signals from the controller 22 does not have negative edge versus positive edge inaccuracies that could be attributed to magnet pole-to-pole spacing issues. It is thus possible to count 12 pulses per revolution, and hence achieve twice the resolution as the 6 pulse per revolution embodiment.

Figure 6:
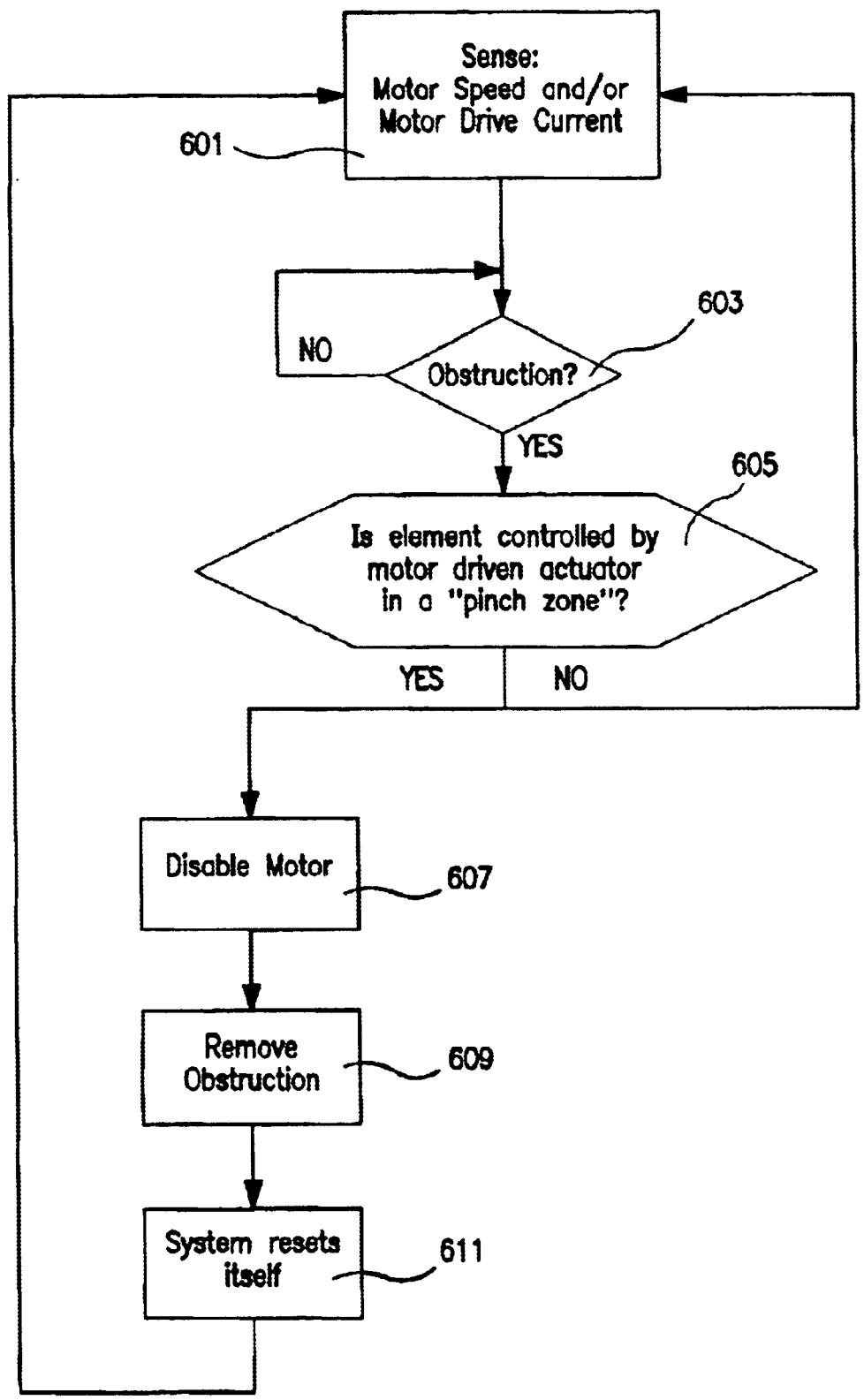
FIG. 6 is a flow chart illustrating an exemplary method of providing pinch protection consistent with the invention.

Turning now to FIG. 6, a method consistent with the present invention is illustrated. The first step 601 senses motor speed and/or current draw by any of the various mechanisms discussed earlier. Based on motor speed and/or current draw variation, a determination is made whether a slowing speed or increased current draw results from an obstruction or from normal or expected load conditions. If the movable element, e.g. the window lift mechanism 19, is in a pinch protection zone, then the controller interrupts the power supply 18 to the motor 12 to disable the motor 605, 607. If the element is not in a pinch protection zone, then the motor is not disabled and flow returns to step 601. Again, a non-pinch protection zone may be that area where no safety or pinching hazard exists given the position of the movable element relative to other stationary objects. Therefore, disabling the motor in such a situation may not be desirable. Once the motor has been disabled 607, the obstruction may be removed 609. Once the obstruction is removed, the system automatically resets 611 and the flow is returned to step 601 to continuously monitor motor speed and/or drive current to determine if an obstruction exists.

Although various embodiments are specifically illustrated and described herein, it will be appreciated that modifications and variations of the present invention are covered by the above teachings and are within the purview of the appended claims without departing from the spirit and intended scope of the invention. Also, it will be appreciated that the functionality described for the embodiments of the invention may be implemented in hardware, software, or a combination of hardware and software, using well-known techniques. If in software, a processor and machine-readable medium, such as memory 17, is required. The processor can be any type of processor capable of providing the speed and functionality required by the embodiments of the invention. For example, the processor could be embodied in a commercially available brushless DC motor controller, or may be a processor from the Pentium® family of processors made by Intel Corporation, or the family of processors made by Motorola or Texas Instruments.

Machine-readable media include any media capable of storing instructions adapted to be executed by a processor. Examples of such media include, read-only memory (ROM), random-access memory (RAM), programmable ROM, erasable programmable ROM, electronically erasable programmable ROM, dynamic RAM, magnetic disk (e.g. floppy disk and hard drive), optical disk (e.g. CD-ROM), and any other devices that can store digital information. In one embodiment, the instructions are stored on the medium in a compressed and/or encrypted format.

As used herein, the phrase "adapted to be executed by a processor" is meant to encompass instructions stored in a compressed and/or encrypted format, as well as instructions that have to be compiled or installed by an installer before being executed by the processor. Further the processor and machine-readable medium may be part of a larger system that may contain various combinations of machine-readable storage devices through various I/O controllers, which are accessible by the processor and which are capable of storing a combination of computer program instructions and data.

What is claimed is:

1. An electro-mechanical actuator comprising:
   a brushless DC motor for driving an output of said actuator; and
   a controller configured to interrupt operation of said motor in response to at least one feedback signal, said feedback signal being representative of variation of at least one motor parameter with respect to variation of torque, said motor parameter comprising at least one of motor speed and motor current draw, and said motor parameter varying with variation in a load on said output.

2. An actuator according to claim 1, wherein said brushless DC motor is coupled to said output through a gear train.

3. An actuator according to claim 1, wherein said controller is configured to interrupt operation of said motor when said feedback signal reaches a predetermined value.

4. An actuator according to claim 1, wherein said at least one feedback signal includes a second feedback signal is representative of a rotational position of a rotor of said motor.

5. An actuator according to claim 4, said actuator further comprising at least one position sensor for providing said second feedback signal.

6. An actuator according to claim 5, wherein said at least one position sensor comprises a Hall effect sensor disposed adjacent said rotor.

7. An actuator according to claim 6, wherein said rotor comprises a two-pole pair permanent magnet rotor, and said at least one position sensor comprises three Hall effect sensors equally spaced along a circumference of said rotor.

8. An actuator according to claim 4, wherein said controller is configured to disable said motor when said rotor has made a predetermined number of rotations and variation of said motor speed with torque reaches a predetermined level.

9. A vehicle window lift system for moving a vehicle window between open and closed positions, said system comprising:
   a brushless DC motor for driving an output of an actuator, said output being coupled to a window lift mechanism for moving said window between said open and closed positions; and
   a controller configured to interrupt operation of said motor in response to at least one feedback signal, said feedback signal being representative of variation of at least one motor parameter with respect to variation of torque, said motor parameter comprising at least one of motor speed and motor current draw, and said motor parameter varying with variation in a load on said window.

10. A system according to claim 9, wherein said brushless DC motor is coupled to said output through a gear train.

11. A system according to claim 9, wherein said controller is configured to interrupt operation of said motor when said feedback signal reaches a predetermined value.

12. A system according to claim 9, wherein said at least one feedback signal includes a second feedback signal is representative of a rotational position of a rotor of said motor.

13. A system according to claim 12, said actuator further comprising at least one position sensor for providing said second feedback signal.

14. A system according to claim 13, wherein said at least one position sensor comprises a Hall effect sensor disposed adjacent said rotor.

15. A system according to claim 14, wherein said rotor comprises a two-pole pair permanent magnet rotor, and said at least one position sensor comprises three Hall effect sensors equally spaced along a circumference of said rotor.

16. A system according to claim 9, wherein said controller is configured to disable said motor when said rotor has made a predetermined number of rotations and variation of said motor speed with torque reaches a predetermined level.

17. A method of providing pinch protection in vehicle window lift system for moving a vehicle window between open and closed positions, said method comprising:
   providing a brushless DC motor for driving an output of an actuator, said output being coupled to a window lift mechanism for moving said window between said open and closed positions;
   sensing at least one motor parameter of said motor that varies with a variation in a load on said window, said motor parameter comprising at least one of motor speed and motor current draw;
   sensing torque of said motor; and
   disabling said motor when a variation in said motor parameter with respect to a variation in said torque reaches a predetermined level.

18. A method according to claim 17, said method further comprising:
   identifying at least one zone of travel for said window wherein pinch protection is enabled; and
   determining if said window is in said zone,
   and wherein said motor is disabled in said disabling step if said window is in said zone as determined in said determining step.

* * * * *

UNITED STATES PATENT AND TRADEMARK OFFICE
CERTIFICATE OF CORRECTION

PATENT NO. : 6,806,664 B2
DATED : October 19, 2004
INVENTOR(S) : Eric Beishline

It is certified that error appears in the above-identified patent and that said Letters Patent is hereby corrected as shown below:

Column 7,
Line 50, after the word "signal", delete the word "is";

Column 8,
Line 23, after the word "signal", delete the word "is";

Signed and Sealed this

Twelfth Day of April, 2005

JON W. DUDAS
*Director of the United States Patent and Trademark Office*